N. G. SPENCER.
FLOUR SIFTER.
APPLICATION FILED FEB. 25, 1914.
1,148,124.
Patented July 27, 1915.
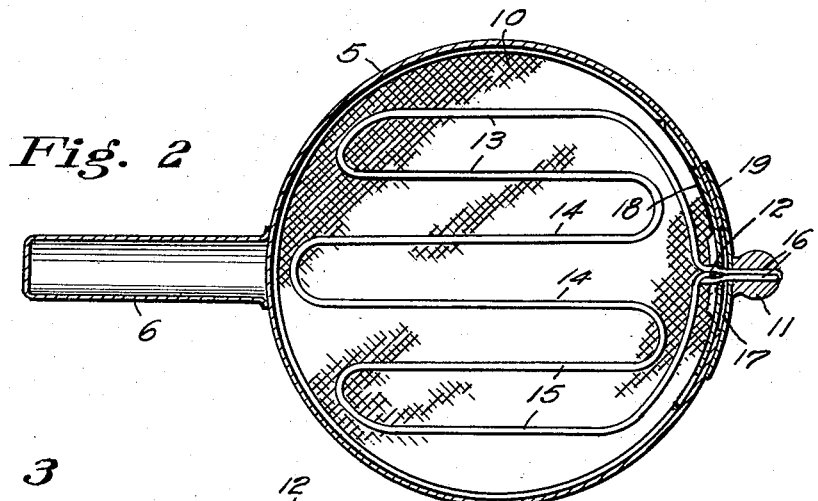
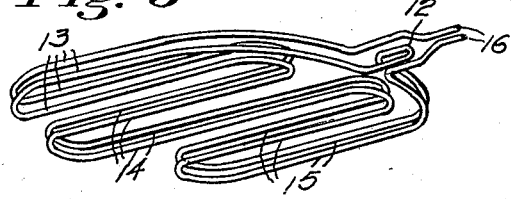
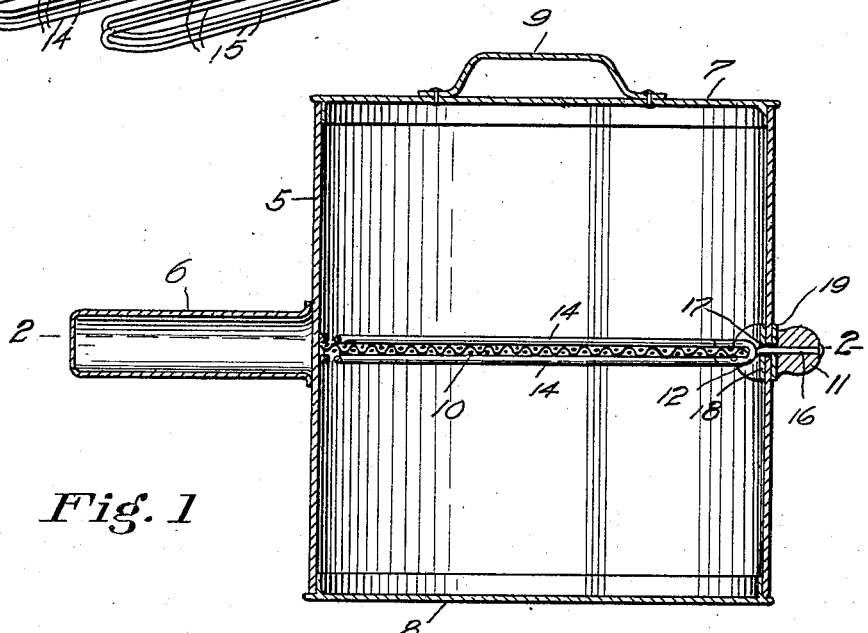
WITNESSES:
E. Peterson
Clarence C. Cook
INVENTOR:
Nellie G. Spencer
BY
Pierre Barnes
ATTORNEY

UNITED STATES PATENT OFFICE.

NELLIE G. SPENCER, OF SEATTLE, WASHINGTON.

FLOUR-SIFTER.

1,148,124.      Specification of Letters Patent.      Patented July 27, 1915.

Application filed February 25, 1914. Serial No. 820,947.

*To all whom it may concern:*

Be it known that I, NELLIE G. SPENCER, a citizen of the United States, residing at Seattle, in the county of King and State of Washington, have invented certain new and useful Improvements in Flour-Sifters, of which the following is a specification.

This invention relates to kitchen utensils, its object being to furnish an improved flour sifter which will afford a handy and useful device, and facilitate the work of sifting flour.

The sifter is illustrated in the accompanying drawings, which show the form I prefer the invention to take.

Figure 1 is a vertical section of the flour sifter. Fig. 2 is a horizontal section through 2—2 of Fig. 1. Fig. 3 is a perspective view of the flour agitator shown detached.

In the drawings, 5 represents a cylindrical vessel of suitable size, having open ends and provided with a handle 6. Detachable closures or covers 7 and 8 are provided for the respective ends of the vessel and one or both of the covers may be provided with a handle, such as 9, to render the removal of the same more convenient.

Intermediate the height of the vessel is a horizontally disposed foraminated partition, or screen, 10 of wire gauze, or other material. Provided above and below said screen are the companion members of an agitator, said members being joined together and formed with ends which extend exteriorly of the vessel into an operating handle 11.

As shown in the drawings, the referred to agitator is formed of a single piece of wire which is provided at about its midlength with a loop 12 which joins the above-mentioned companion members. In each of the latter the wire is looped, as shown in Figs. 2 and 3, to afford a plurality of substantially parallel elements 13, 14 and 15. Finally, the wire is extended to within proximity of the loop 12 and thence the ends 16 pass through a peripheral slot 17 provided in the circular wall of the vessel 5 and are socketed in the aforesaid handle 11.

18 and 19 are arcuate shaped plates secured to the agitator at the inner and outer sides of the vessel wall to cover the slot 17.

In operating the device, the cover 7 is first removed and the flour deposited in the compartment above screen 10. After said cover is replaced, the sifter is held by the operator grasping the handle 6 in her left hand and with her other hand the agitator is actuated through the medium of the handle 11 to cause the same to traverse the screen for agitating the flour and facilitating its passage through the screen. The cover 7 is again removed and the lumps or particles of flour which were too coarse to pass through the screen are dumped out. The cover 7 is then restored to the vessel and the latter turned upside down, whereupon the agitator is operated to cause the flour to be re-sifted through the screen into the compartment now below the screen. The flour may now be removed if of sufficient fineness or by repeating the above described operations it may be re-sifted as many times as deemed requisite.

The cover 8 is removable only for cleaning purposes and by preference it is unprovided with a handle.

What I claim as my invention, is—

A flour sifter comprising a vessel having a removable closure for each end, a screen arranged in said vessel mid-way the ends thereof, and an agitator formed of a single piece of wire having an off-set portion intermediate the ends thereof to provide an upper and lower section, each section bent to provide a plurality of elements, with the elements of each section arranged in parallelism on opposite sides of the screen, the ends of the wire being positioned adjacent the off-set portion and extending through the side of the vessel to constitute a handle for operating the agitator.

Signed at Seattle, Wash., this 16th day of February, 1914.

NELLIE G. SPENCER.

Witnesses:
    E. PETERSON,
    HORACE BARNES.

Copies of this patent may be obtained for five cents each, by addressing the "Commissioner of Patents, Washington, D. C."